US008218560B2

(12) United States Patent
Fujinami et al.

(10) Patent No.: US 8,218,560 B2
(45) Date of Patent: Jul. 10, 2012

(54) APPARATUS AND METHOD FOR DEMULTIPLICATION

(75) Inventors: Yasushi Fujinami, Tokyo (JP); Goro Hayakawa, Saitama (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 981 days.

(21) Appl. No.: 11/791,833

(22) PCT Filed: Nov. 1, 2005

(86) PCT No.: PCT/JP2005/020090
§ 371 (c)(1),
(2), (4) Date: May 30, 2007

(87) PCT Pub. No.: WO2006/059449
PCT Pub. Date: Jun. 8, 2006

(65) Prior Publication Data
US 2008/0013562 A1    Jan. 17, 2008

(30) Foreign Application Priority Data

Dec. 2, 2004  (JP) ................................ 2004-350362

(51) Int. Cl.
*H04L 12/28* (2006.01)
(52) U.S. Cl. ........................................ 370/412; 370/230
(58) Field of Classification Search .................. None
See application file for complete search history.

(56) References Cited

U.S. PATENT DOCUMENTS

| 5,751,887 | A  | * | 5/1998  | Nitta et al. ...................... 386/68 |
| 6,131,113 | A  | * | 10/2000 | Ellsworth et al. ............. 709/213 |
| 6,151,441 | A  |   | 11/2000 | Kawamura et al. |
| 6,314,478 | B1 | * | 11/2001 | Etcheverry ....................... 710/29 |
| 6,463,486 | B1 |   | 10/2002 | Parry et al. |
| 7,113,516 | B1 | * | 9/2006  | Shefi et al. ..................... 370/412 |
| 7,230,917 | B1 | * | 6/2007  | Fedorkow et al. ............. 370/229 |
| 7,269,179 | B2 | * | 9/2007  | Wolrich et al. ................. 370/412 |
| 7,362,761 | B2 | * | 4/2008  | Suzuki et al. .................. 370/394 |
| 7,499,399 | B2 | * | 3/2009  | Kumar et al. .................. 370/232 |
| 7,567,556 | B2 | * | 7/2009  | Beshai ........................... 370/360 |

FOREIGN PATENT DOCUMENTS

| EP | 0 686 973 A1 | 12/1995 |
| EP | 1 471 739 A2 | 10/2004 |
| WO | WO-95/16990 | 6/1995 |

OTHER PUBLICATIONS

Extended European Search Report dated Feb. 11, 2009 for corresponding European Application No. 05 79 9969.
Japanese Office Action issued Apr. 26, 2010 for corresponding Japanese Application No. 2004-350362.

* cited by examiner

*Primary Examiner* — Michael J Moore, Jr.
(74) *Attorney, Agent, or Firm* — Rader Fishman & Grauer, PLLC

(57) ABSTRACT

Disclosed is a demultiplexer for demultiplexing a multiplexed stream, obtained on time division multiplexing a plurality of elementary streams. A buffer controller, forming this demultiplexer, writes a multiplexed stream, beginning from a location specified by a data write pointer of a ring buffer, configured for storing data of the multiplexed stream, in the manner of an endless loop. On receipt of an ES1 readout request, an ES1 readout control unit takes out, from an ES1 readout pointer storage unit, a readout pointer, as a start point of retrieving an area in the ring buffer where the oldest ES1 is stored. The ES1 readout control unit then retrieves and reads out the ES1, with a location specified by the ES1 readout pointer, as a start point, and sends the ES1, thus read out, to the source of the request. The ES1 readout control unit then updates the ES1 readout pointer and the data leading end pointer.

11 Claims, 11 Drawing Sheets

| ES sort | stream_id | private_stream_id |
|---|---|---|
| video | 0xE0~0xEF | (none) |
| ATRAC audio | 0xBD | 0x00~0x0F |
| LPCM audio | 0xBD | 0x10~0x1F |
| caption | 0xBD | 0x80~0x9F |

FIG.9

APPARATUS AND METHOD FOR DEMULTIPLICATION

The present invention contains subject matter related to Japanese Patent Application JP 2004-350362 filed in the Japanese Patent Office on Dec. 2, 2004, the entire contents of which being incorporated herein by reference.

BACKGROUND OF THE INVENTION

1. Technical Field

This invention relates to an apparatus and method for demultiplication. More particularly, the present invention relates to an apparatus and method for demultiplexing a stream resulting from time division multiplexing of plural elementary streams.

2. Background Art

In the past, a multiplexed stream, obtained on time-division multiplication of elementary streams, is demultiplexed by a demultiplexer, and thence supplied to a decoder for decoding.

FIG. 1 depicts a block diagram showing a typical conventional demultiplexer 500. The demultiplexer 500, shown in FIG. 9, is built in, for example, a disc apparatus, and transiently memorizes a multiplexed stream, read out from a disc, to resolve the stream into elementary streams of video, audio and caption, which are then supplied to a decoder 560.

A multiplexed stream storage unit 510 transiently memorizes the multiplexed stream, read out from the disc. A syntax analysis unit 520 separates a video stream, an audio stream and a caption stream, from the multiplexed stream stored in the multiplexed stream storage unit 510, and sends the streams to a video stream storage unit 530, an audio stream storage unit 540 and a caption stream storage unit 550. The elementary streams supplied are stored in the respective elementary stream storage units. The decoder 560 is provided with a video decoder control module, an audio decoder control module and a caption decoder control module. When data commences to be stored in the video stream storage unit 530, audio stream storage unit 540 or the caption stream storage unit 550, the decoder requests the elementary streams stored, and proceeds to decode supplied data.

That is, in the conventional demultiplexer 500, there occur three data movement events, viz.

(i) copying of a multiplexed stream, entered from outside, to the multiplexed stream storage unit 510 (data movement), (ii) data movement from the multiplexed stream storage unit 510 via syntax analysis unit 520 to the respective elementary stream storage units (the video stream storage unit 530, audio stream storage unit 540 and the caption stream storage unit 550), and (iii) data supply from the respective elementary stream storage units to the respective decoder modules (data movement).

The configuration of the respective stream storage units will now be explained.

FIG. 2 schematically shows a conventional multiplexed stream storage unit. The multiplexed stream storage unit 510 is formed on a memory, and includes a buffer 510a for transient storage of a multiplexed stream, a data leading end pointer storage unit 511, for transient storage of a data leading end pointer, and a data write pointer storage unit 512, for transient storage of a data write pointer. A buffer control means, not shown, controls the writing of the multiplexed stream in the buffer 501a, based on the pointers stored in the data leading end pointer storage unit 511 and in the data write pointer storage unit 512.

The buffer 510a is, for example, a buffer, and sequentially memorizes input data. After data has been stored to the full storage ability of the buffer, the written data is overwritten, beginning from the oldest data, in the manner of a limitless loop. The data leading end pointer storage unit 511 memorizes the data leading end pointer indicating the location where there are stored unread oldest data, out of the data stored in the buffer 510a. The data write pointer storage unit 512 memorizes data write pointer, indicating the location of the buffer 510a in which to write the latest data read out from the disc. Hence, the data stored in an area proceeding clockwise from the location indicated by the data leading end pointer as far as the location indicated by the data write pointer, shown shaded in FIG. 2, is the effective data.

FIG. 3 schematically shows a conventional video stream storage unit. The video stream storage unit 530 includes a video buffer 530a, provided on a memory for transient storage of a video stream, a video stream leading end pointer storage unit 531 for transient storage of a video stream leading end pointer, a video stream write pointer storage unit 532 for transient storage of a video stream write pointer, and an ancillary information FIFO (First In First Out) unit 533 for storage of ancillary data. Based on the pointers, stored in the video stream leading end pointer storage unit 531 and in the video stream write pointer storage unit 532, the data writing in the video buffer 530a of the video stream supplied to the syntax analysis unit 520 is controlled by a video buffer control means, not shown.

Similarly to the buffer 510a of the multiplexed stream storage unit 510, the video buffer 530a is a ring buffer, and memorizes the video stream, supplied from the syntax analysis unit 520, in the fashion of an endless loop. The video stream leading end pointer storage unit 531 memorizes video stream leading end pointer, whilst the video stream write pointer storage unit 532 memorizes video stream write pointer. The locations indicated by the two pointers are also updated clockwise. The data stored in an area proceeding clockwise from the location indicated by the video stream leading end pointer as far as the location indicated by the video stream write pointer, shown shaded in FIG. 3, represents valid data. In the ancillary information FIFO unit 533, the ancillary information, such as time stamp, separated by the syntax analysis unit 520, is stored.

The audio stream storage unit 540 and the caption stream storage unit 550 are configured similarly to the video stream storage unit 530, and includes a ring buffer, a leading end pointer storage unit, a write pointer storage unit and an ancillary information FIFO unit.

Data movements between stream storage units of the above-described demultiplexer 500 will now be explained. It is noted that control means for managing data write control for respective buffers of the demultiplexer 500, such as buffer control means or video buffer control means, may be implemented by a CPU (Central Processing Unit), not shown, executing programs stating the processing contents of respective control means.

Initially, data movements to the first multiplexed stream storage unit will be explained. The buffer control means writes the multiplexed stream, supplied thereto, beginning from the location of the buffer 510a, specified by the data write pointer, registered in the data write pointer storage unit 512 of the multiplexed stream storage unit 510, and increments the data write pointer by an amount corresponding to the size of the written data.

Next, the data movement from the second multiplexed stream storage unit to the respective elementary stream storage units will be explained, taking the case of a video stream as an example. The syntax analysis unit 520 reads out a multiplexed stream from the buffer 510a and demultiplexes the stream using an ID acquired as the identification information for discriminating (specifying) the elementary stream being reproduced. From the location of the buffer 510a, indicated by the data leading end pointer, stored in the leading end pointer storage unit 511, readout is commenced, and the data leading end pointer is incremented by an amount corresponding to the size of readout data. The video stream, obtained on demultiplexing, and the relevant ancillary information, are delivered to the video stream storage unit 530. The video stream is transiently stored in the video buffer 530a. It is noted that the writing is from the location of the video buffer 530a indicated by the video stream write pointer registered in the video stream write pointer storage unit 532, and the video stream write pointer is incremented in an amount corresponding to the size of the written data. The ancillary information is transiently stored in the ancillary information FIFO unit 533. In similar manner, the audio information and the ancillary information, separated by demultiplexing, are delivered to the audio stream storage unit 540 and transiently stored in the audio buffer and in the ancillary information FIFO unit, respectively. The caption information and the ancillary information, separated by demultiplexing, are delivered to the caption stream storage unit 550, and transiently stored in the tile buffer and in the ancillary information FIFO unit, respectively.

Data movements from the third elementary stream storage unit to the respective decoders will now be explained, taking the case of the video stream as an example. When data has begun to be stored in the video buffer 530a of the video stream storage unit 530, a video buffer control means of the decoder 560 commences to read out data from the video buffer 530a, and acquires a video access unit, the time stamp appended to the video access unit or the ancillary information to carry out the decoding. Similar processing is carried out in the case of the audio stream and the caption stream.

On the other hand, a stream reproducing method in which each stream separated from the multiplexed stream is directly transmitted to a buffer of a decoder, without transmitting the stream directly to a dedicated memory for storage therein, has been proposed in, for example the JP Laid-Open Patent 2003-61045.

DISCLOSURE OF THE INVENTION

The above-described conventional demultiplexing apparatus and methods suffer from the problem that the data transfer may give rise to lowered processing ability of he CPU.

In the conventional demultiplexing apparatus and methods, data movement occurs thrice, that is, data is written in the multiplexed stream storage unit 510, then transferred from the multiplexed stream storage unit 510 to the respective elementary stream storage units, and then transferred from the elementary stream storage units to the decoder 560. The respective processing means of the demultiplexer 500 are formed by software. In a computer system, architected by, for example, a CPU and a memory, the processing ability of the CPU is drastically lowered during data movements, thus lowering the overall processing ability.

Moreover, since data is transferred thrice, there is raised a problem that the data readout pointer and the data write pointer must be provided for each data transfer, with the result that a buffer for storage of a large number of pointers is needed. In addition, since many pointers need to be provided, buffer control is complicated, thus imposing significant load on the CPU.

In view of the above-depicted problem of the related art, it is desirable to provide an apparatus and method for demultiplexing in which the processing ability may be improved by reducing the load imposed on the CPU.

The present invention provides a demultiplexer for demultiplexing a multiplexed stream, obtained on time division multiplexing a plurality of elementary streams. The demultiplexer includes a ring buffer, a data leading end pointer storage means, a data write pointer storage means, a buffer control means, a readout pointer storage means and a readout control means.

The ring buffer, forming this demultiplexer, sequentially memorizes data of a multiplexed stream and, when the stored data volume exceeds the storage capacity, the ring buffer overwrites the oldest data of the multiplexed stream, such as to store data. The data leading end pointer storage means holds a data leading end pointer, specifying a location of the ring buffer where the oldest data is stored, whilst the data write pointer holds a data write pointer specifying a location of the ring buffer where the latest data of the multiplexed stream is written. When supplied with a multiplexed stream, the buffer control means writes the input multiplexed stream, beginning from the location of the ring buffer specified by the data write pointer, while updating the data write pointer, depending on the write size, and storing the so updated data write pointer in a data write pointer storage means. A readout pointer storage means stores a readout pointer, specifying the readout start point of data of a targeted elementary stream, not as yet read out from the ring buffer, from every elementary stream which is to be read out. The readout control means takes out the readout pointer of the elementary stream, requested to be read out, from the readout pointer storage means, retrieves and reads out the targeted elementary stream from the location of the ring buffer specified by the readout pointer, and updates the readout pointer and the data leading end pointer of the elementary stream of interest, depending on the readout size.

With the demultiplexer of the present invention, the buffer control means, supplied with the multiplexed stream, retrieves the data write pointer, from the pointer storage means, and sequentially stores the data of the multiplexed stream, beginning from the location specified by the data write pointer, while updating the data write pointer. At this time, the data leading end pointer is referenced so that writing will not be made beyond the location pointed to by the data leading end pointer. On receipt of the readout request of a preset elementary stream, the readout control means takes out the readout pointer concerning the elementary stream, and the elementary stream of interest is retrieved, with the location specified by the readout pointer as a start point, to read out data of the retrieved transfer elementary stream to send the data to the source of the request. The readout pointer and the data leading end pointer are updated, depending on the readout size.

The present invention also provides a method for demultiplexing a multiplexed stream, obtained on time division multiplexing a plurality of elementary streams, in which, when buffer control means is supplied with the multiplexed stream, the buffer control means sequentially writes the multiplexed stream supplied, based on a data write pointer indicating the latest data write location of a ring buffer configured for sequentially memorizing data of the multiplexed stream in an endless loop, at a location of the ring buffer specified by the data write pointer, and updates the data write pointer depending on the write size. When a readout request for a preset one of the elementary streams is received, readout control means takes out the readout pointer concerning the preset elementary stream as requested by readout pointer storage means, having stored the readout pointer as starting point of elementary-stream-based readout processing, retrieves and reads out the preset elementary stream of interest, with a location of the ring buffer, specified by the readout pointer, as a start point. The readout control means updates the readout pointer, depending on the readout size, and updates the data leading end pointer specifying the location of the ring buffer where the oldest data of the multiplexed stream is stored.

With the demultiplexing method of the present invention, when the multiplexed stream is supplied, it is sequentially written from the location specified by the data write pointer specifying the latest data write position in the ring buffer. Writing is made so that the location specified by the data leading end pointer is not surpassed. On the other hand, if there is a readout request for reading out the respective requested elementary streams from the location specified by the readout pointers, the readout pointer, specifying the location of the ring buffer, as a readout start point, stored for each elementary stream, is taken out, such that the elementary stream of interest, as requested, is retrieved from the location as pointed to by the readout pointer. When data of the elementary stream of interest has been retrieved, the data is read out and transmitted to the source of the request. After the transfer, the readout pointer and the leading end point pointer are updated, depending on the readout size.

With the a demultiplexing apparatus and method, according to the present invention, in which data may be transmitted to the source of the request as the multiplexed stream is demultiplexed, there may be accrued the merit that the number of times of data transfer operations can be reduced, while the CPU processing load may be relieved.

By reducing the number of times of data transfer operations, the number of pointers used for data transfer may be reduced, such that the buffer capacity may be reduced and buffer control may be facilitated.

Other objects and specified advantages of the present invention will become more apparent from the following explanation of preferred embodiments thereof especially when read in conjunction with the drawings.

BRIEF DESCRIPTION OF THE DRAWINGS

FIG. 9 illustrates the relationship between the stream_id and the private_stream_id for discriminating an elementary stream, and the elementary stream.

BEST MODE FOR CARRYING OUT THE INVENTION

Figure 1:
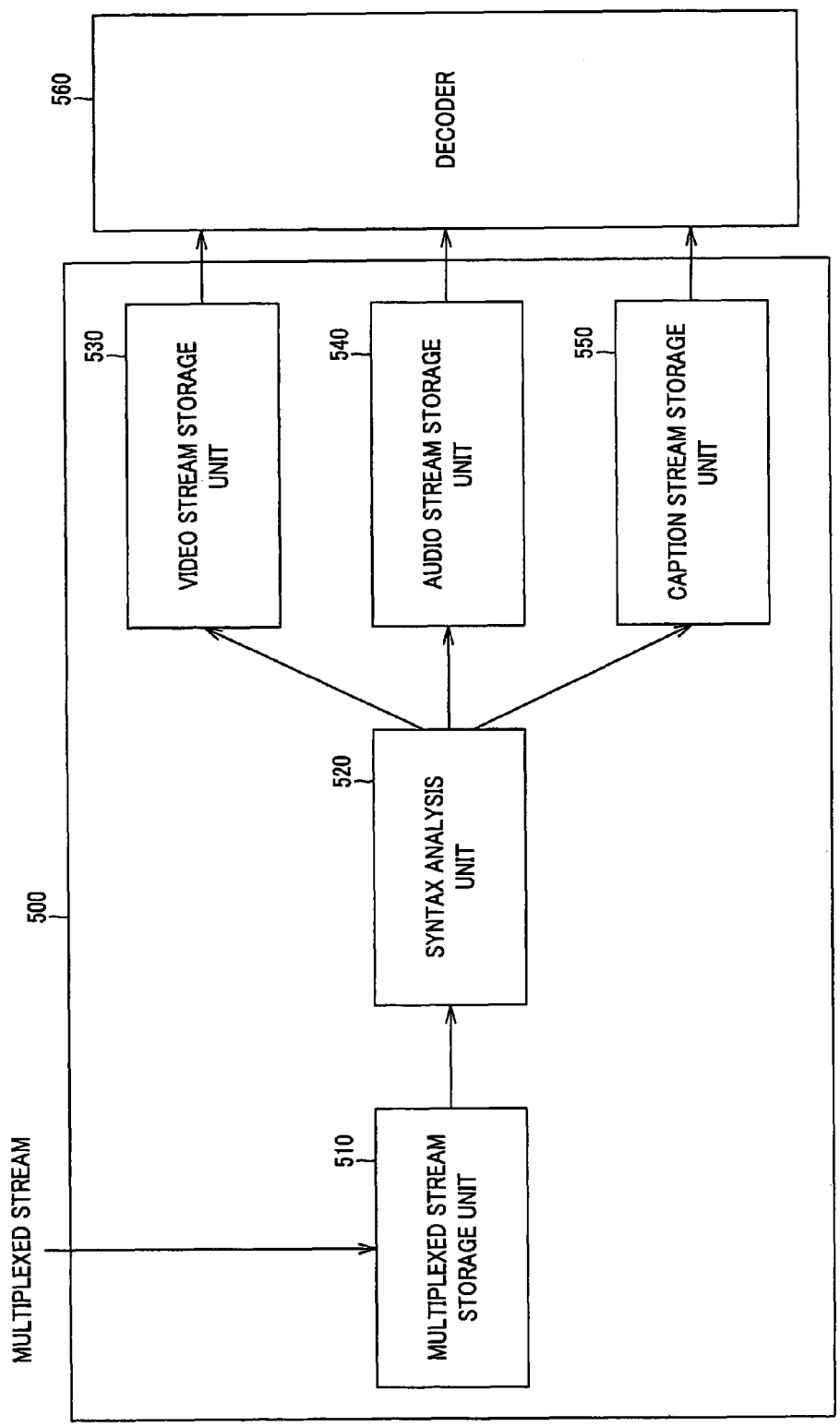
FIG. 1 is a block diagram showing an illustrative conventional demultiplexer.

Referring to the drawings, preferred embodiments of the present invention will be explained in detail.

Figure 4:
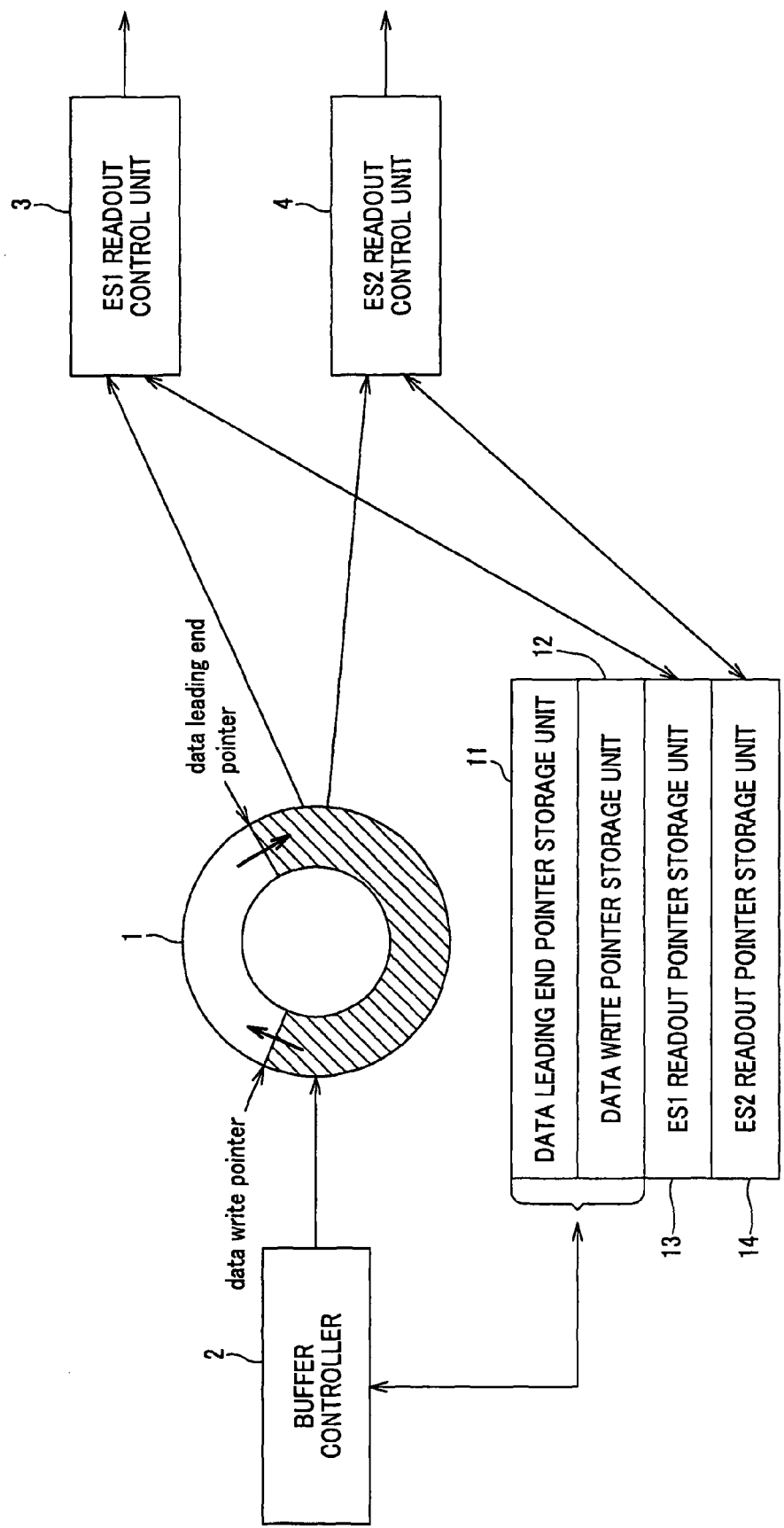
FIG. 4 illustrates an embodiment of a multiplexed stream storage unit embodying the present invention.

Referring to FIG. 4 for illustrating the data demultiplexer, embodying the present invention, a data demultiplexer, shown therein, includes a ring buffer 1 for storage of a multiplexed stream, obtained on time division multiplexing an elementary stream 1 and an elementary stream 2, abbreviated to ES1 and ES2, respectively, as an endless loop, a buffer controller 2 for controlling the writing of the multiplexed stream in the ring buffer 1, an ES1 readout controller 3 and an ES2 readout controller 4, forming a readout control means for reading out the ES1 and ES2 from the ring buffer 1, respectively, and a variety of management information storage units. These management information storage units are comprised of a data leading end pointer storage unit 11, a data write pointer storage unit 12, an ES1 readout pointer storage unit 13 and an ES2 readout pointer storage unit 14.

The ring buffer 1 memorizes the multiplexed stream, written by the buffer controller 2, as an endless loop. That is, the ring buffer sequentially memorizes input data and, after storage of data to its full ability, stores data as it overwrites the written data, in the order the data were stored. The ring buffer 1 is supervised by the data leading end pointer, stored in the data leading end pointer storage unit 11, and by the data write pointer, stored in the data write pointer storage unit 12. In the data demultiplexer, shown in FIG. 4, the location indicated by the data write pointer is updated in the clockwise direction, denoted by arrow in FIG. 4, by the buffer controller 2, each time data has been stored in the ring buffer 1. The location indicated by the data leading end pointer is updated in the clockwise direction, indicated by an arrow in FIG. 4, by the ES1 readout control unit 3 and the ES2 readout control unit 4, responsive to readout of the ES data from the ring buffer 1.

The buffer controller 2 controls the writing of the multiplexed stream in the ring buffer 1. When supplied with the multiplexed stream, the buffer controller 2 retrieves a data leading end pointer and a data write pointer, from the data leading end pointer storage unit 11 and the data write pointer storage unit 12, respectively, and proceeds to write data sequentially, beginning from the location in the ring buffer 1 specified by the data write pointer. The buffer controller updates the data write pointer by incrementing it clockwise in FIG. 4, in an amount corresponding to the data size, for storage in the data write pointer storage unit 12. If the data write outruns the location specified by the data leading end pointer, data writing is delayed.

The ES1 readout control unit 3 and the ES2 readout control unit 4 are provided with a demultiplexing function of extracting and reading out the ES1 and the ES2 from the ring buffer 1, respectively.

On receipt of an ES1 readout request, the ES1 readout control unit 3 retrieves the ES1 readout pointer from the ES1 readout pointer storage unit 13, and retrieves the ES1, beginning from the location in the ring buffer 1, specified by the S1 readout pointer to read out the so retrieved ES1 data. The so read out data are transmitted to the source of the request. The ES1 readout pointer is updated so that it will point to the location in the ring buffer 1 next to the location where the data thus read out was stored. The data leading end pointer is also updated as necessary. For example, if the location specified by an ES1 readout pointer points to a location where there are stored data older than the data specified by other ES readout pointers, readout of the data older than the data corresponding to the ES1 readout pointer is already finished. Hence, the data leading end pointer is updated to the same location as this ES1 readout pointer.

On receipt of an ES2 readout request, the ES2 readout control unit 4 retrieves the ES2 readout pointer from the ES2 readout pointer storage unit 14, and retrieves the ES2, beginning from the location in the ring buffer 1, specified by the ES2 readout pointer, to read out the so retrieved ES2 data. The so read out data are transmitted to the source of the request. The ES2 readout pointer is updated so that it will point to the location in the ring buffer 1 next to the location where the data thus read out was stored. The data leading end pointer is also updated as necessary, as in the case of the ES1 readout control unit 3.

The data leading end pointer storage unit 1 and the data write pointer storage unit 12 store the data leading end pointer and the data write pointer, respectively. The ES1 readout pointer storage unit 13 and the ES2 readout pointer storage unit 14 store the ES1 readout pointer and the ES2 readout pointer, respectively.

The operation of the above-described demultiplexer and the demultiplexing method will now be explained. The demultiplexer according to the present invention manages control for writing an input time-division multiplexed stream in the ring buffer 1 and for extracting (separating) and outputting the requested ES from the ring buffer 1 responsive to the readout request.

In more detail, when a multiplexed stream is supplied to the demultiplexer, the buffer controller 2 takes out the data leading end pointer and the data write pointer from the data leading end pointer storage unit 11 and the data write pointer storage unit 12, respectively, to write data of the input multiplexed stream, beginning from the location in the ring buffer 1 specified by the data write pointer. In the apparatus shown in FIG. 4, data are written sequentially in the clockwise direction. Data writing is controlled at this time so that the data write pointer will not outrun the data leading end pointer. After the writing has come to a close, the data write pointer is updated for pointing to the location next to the location where the data writing in the ring buffer 1 has come to a close.

On receipt from e.g. a decoder of a readout request of the elementary streams, making up the multiplexed stream (ES1 and ES2 in the case of FIG. 4), the ES1 readout control unit 3 or the ES2 readout control unit 4, related to the requested elementary streams, takes out the ES1 readout pointer or the ES2 readout pointer from the ES1 readout pointer storage unit 13 or the ES2 readout pointer storage unit 14, respectively, and memorizes the readout pointers. The ES1 readout control unit 3 or the ES2 readout control unit 4 retrieves the ring buffer 1 clockwise, from the location of the ring buffer 1 specified by the ES1 readout pointer or the ES2 readout pointer, as a starting point. When the target ES1 or ES2 is detected, it is read out and transmitted to the source of the request. After readout, the ES1 readout pointer or the ES2 readout pointer is updated, depending on the readout size. That is, the pointer is updated for specifying a location where there is stored data containing the oldest ES which has not as yet been read out. Moreover, the data leading end pointer is updated for pointing to the same location as that of the ES1 readout pointer or the ES2 readout pointer pointing to the oldest data.

If, in the above-described demultiplexer, there is made a request for reading out each ES, the target ES may be separated from the multiplexed stream and sent to the source of the request. Hence, the number of times of data transfer may be reduced as compared to the case where the multiplexed stream is demultiplexed at the outset and the resulting elementary streams are stored in the respective ES buffers for subsequent delivery of the ES stored in the buffer when a readout request has been made. That is, three data movement events, namely writing data in the ring buffer, writing the data in the ES buffers and transfer of data read out to the source of the request, may be reduced to two data movements, that is, writing the data in the ring buffer and transfer of the data read out to the source of the readout request, as a result of which the load imposed on the CPU may be reduced and the processing ability may be improved. Additionally, the number of the pointers used for data transfer may be decreased, so that a smaller buffer capacity suffices for storage of the pointers. Since the number of the pointers is smaller, buffer control may be facilitated.

Referring to the drawings, an embodiment of the present invention, in which the present invention is directed to a disc apparatus, will now be explained with reference to the drawings.

It is noted that the present invention may be applied not only to the disc apparatus but also to a system for demultiplexing a multiplexed stream of, for example, digital broadcast data.

Figure 5:
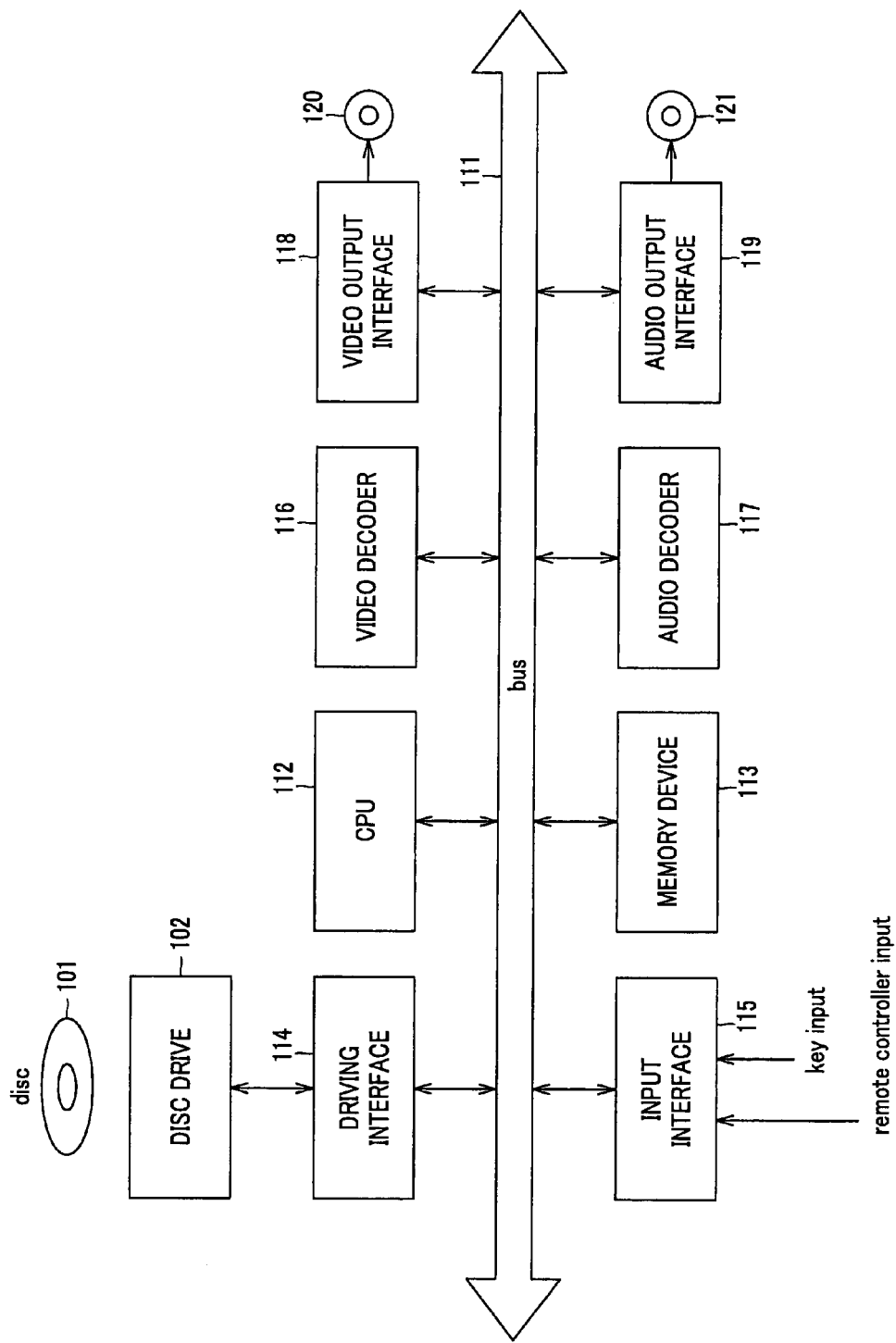
FIG. 5 is a block diagram showing an embodiment of the hardware of a disc apparatus embodying the present invention.

FIG. 5 depicts a block diagram showing an embodiment of a disc apparatus embodying the present invention. The disc apparatus, shown in FIG. 5, may, for example, be applied to a disc player, a game device or to a car navigation system. The multiplexed stream for demultiplexing is composed of time-division multiplexed video, audio and caption streams.

A disc 101 is, for example, an optical disc, such as DVD (Digital Versatile Disc), a magneto-optical disc or a magnetic disc, and has recorded data necessary for reproducing contents data, such as video data, audio data or caption data, and data needed for reproducing the contents data.

A disc drive 102 has enclosed an interface, not shown, and is connected via the interface to a driving interface 114. The disc drive 102 actuates the disc 101, loaded thereon, and reads out data from the disc 101, in accordance with a command, such as a readout command, from the driving interface 114, to send the read-out data to the driving interface 114.

To a bus 111 are connected a CPU 112, a memory device 113, a driving interface 114, an input interface 115, a video decoder 116, an audio decoder 117, a video output interface 118 and an audio output interface 119.

The CPU 112 and the memory device 113 make up a computer system. That is, the CPU 112 executes a set of software modules, as later explained, to control the disc apparatus in its entirety, while managing a variety of processing operations, as later explained. The memory device 113 transiently stores data necessary for the operations of the CPU 112. The memory device 113 may be comprised solely of a non-volatile memory or may be made up by a volatile memory and a non-volatile memory combined together. In case a hard disc is provided to the disc apparatus shown in FIG. 5, and a set of software modules, run by the CPU 112, is recorded in the hard disc, the memory device 113 may be comprised solely by a volatile memory.

It is noted that the program executed by the CPU 112 (set of software modules) may be pre-stored in the memory device 113 as a recording medium enclosed in the disc apparatus. The program may be transiently or permanently stored in removable recording mediums, such as the disc 101, or flexible discs, other than the disc 101, such as CD-ROM (Compact Disc Read Only memory), MO (Magneto Optical) disc, magnetic disc or a memory card. This removable recording medium may be provided as so-called package software.

The program may be pre-stored in the memory device 113 or may be installed from the above-described removable recording medium to the disc apparatus. The program may be transmitted over a wireless route from a downloading site to the disc apparatus via an artificial satellite for digital satellite broadcasting, or may be transmitted over a cable to the disc apparatus, over a network, such as LAN (Local Area Network) or the Internet. The disc apparatus may receive the program, thus transmitted, via input interface 115, to install the program, thus transferred, on the enclosed memory device 113.

The program may be processed by a sole CPU or by plural CPUs by distributed processing.

The driving interface 114 controls the disc drive 102, under control by the CPU 112, in such a manner that data read out by the disc drive 102 from the disc 101 will be sent over bus 111 to the CPU 112, memory device 113, video decoder 116 and to the audio decoder 117.

The input interface 115 receives signals, supplied thereto by an operator acting on a key, a button or a remote controller, not shown, to send the signals over bus 111 to the CPU 112. The input interface 115 also operates as a communication interface.

The video decoder 116 decodes encoded video data, read out by the disc drive 102 from the disc 101, and supplied over the driving interface 114 and the bus 111, to send the resulting video data over bus 111 to the CPU 112 or to the video output interface 118.

Similarly to the video decoder 116, the audio decoder 117 decodes encoded audio data, read out from the disc 101, and supplied to the audio decoder, and sends the resultant audio data over bus 111 to the CPU 112 and to the audio output interface 119.

The video output interface 118 performs necessary processing on video data supplied over bus 111 to output the resulting data at a video output terminal 120. The audio output interface 119 performs necessary processing on audio data supplied over bus 111 to output the resulting data at an audio output terminal 121.

The video output terminal 120 is connected to a video outputting apparatus, such as a CRT (Cathode Ray Tube) or a liquid crystal panel, and sends video data to a video outputting apparatus. The audio output terminal 121 is connected to an audio outputting apparatus, such as a loudspeaker or an amplifier, not shown, to send audio data to an audio outputting apparatus. Meanwhile, the video data or the audio data may be supplied from the disc apparatus over a cable or a wireless route to the video outputting apparatus or to the video outputting apparatus, respectively.

Figure 6:
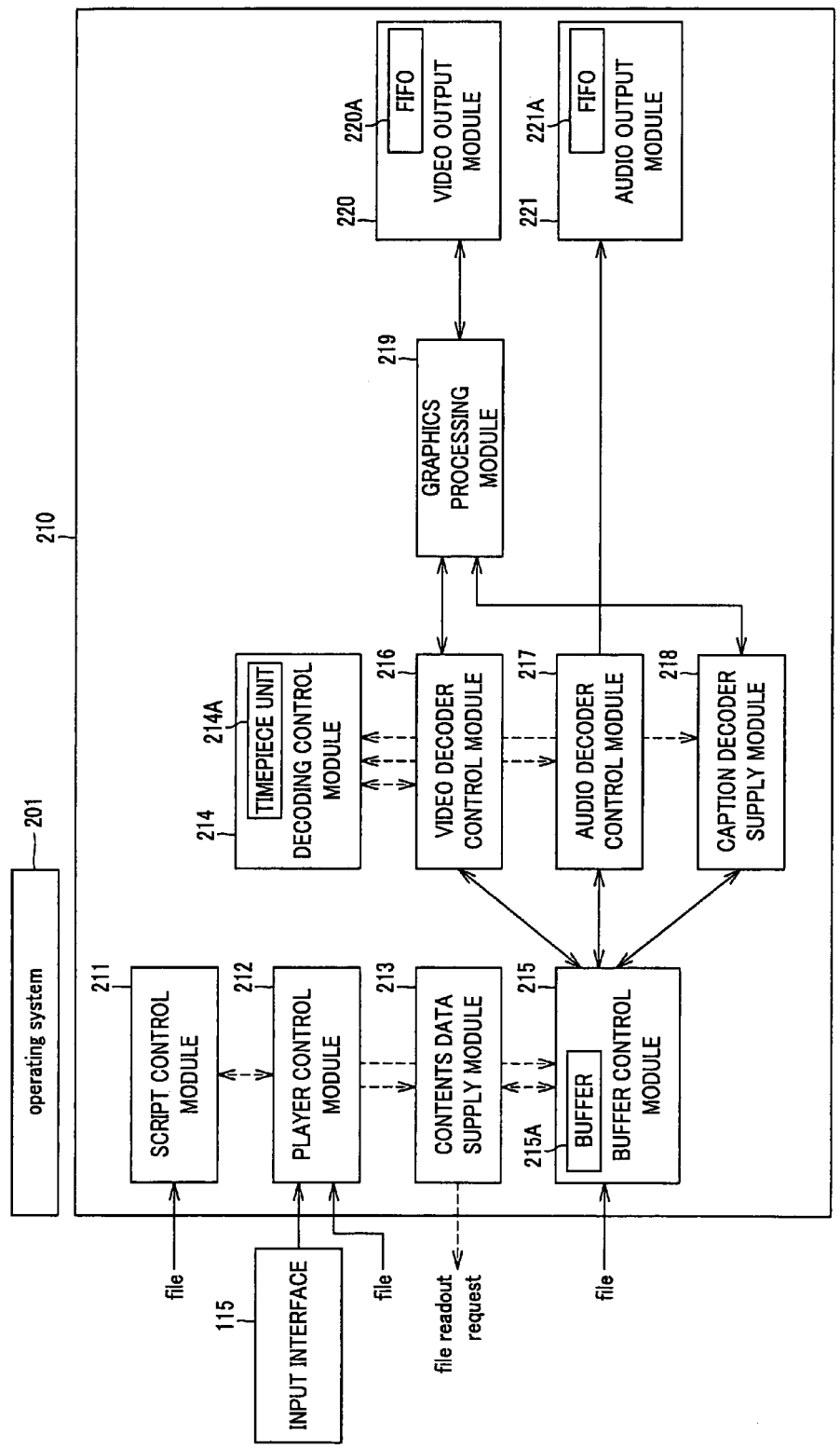
FIG. 6 is a block diagram showing a set of software modules embodying the present invention.

The configuration of the set of software modules will now be explained. FIG. 6 shows an illustrative structure of the set of software modules The set of software modules, executed by the CPU 112, may roughly be classified into an operating system (OS) 201 and a video contents reproducing program 210, as an application program.

On power up of the disc apparatus, the CPU 112 initially executes the operating system 201 to carry out necessary processing, such as default setting, and invokes the video contents reproducing program 210, as an application program.

The video contents reproducing program 210 is made up by a script control module 211, a player control module 212, a contents data supply module 213, a decoding control module 214, a buffer control module 215, a video decoder control module 216, an audio decoder control module 217, a caption decoder control module 218, a graphics processing module 219, a video output module 220 and an audio output module 221.

The script control module 211 interprets and executes the script program (script) stated in a script file recorded on the disc 101.

The player control module 212 refers to, for example, metadata (database information) recorded on the disc 101 to manage control on contents reproduction. The player control module 212 also switches the streams for reproduction, in accordance with commands from the script control module 211 or the input interface 15.

The contents data supply module 213 requests the operating system 201 to read out contents data or metadata from the disc 101, under control by the player control module 212 or on the basis of the quantity of data stored in the buffer control module 215.

It is noted that e.g. the metadata read out from the disc 101 responsive to the request of the contents data supply module 213 are supplied to modules in need of the data. The contents data read out by the operating system 201 from the disc 101 responsive to the request from the contents data supply module 213 are supplied to the buffer control module 215.

The decoding control module 214 controls the operation of the video decoder control module 216, audio decoder control module 217 and the caption decoder control module 218, under control of the player control module 212. The decoding control module 214 has enclosed a timepiece unit 214A for timekeeping and supervises the synchronism of the outputting of the video data, output under control by the video decoder control module 216, and the outputting of data to be output in synchronism with the video data (output data), herein the outputting of audio data, output under control by the audio decoder control module 217.

The buffer control module 215 has enclosed a buffer 215A, as a part of a storage area of the memory device 113 shown in FIG. 5. The contents data read out from the disc 101 are transiently stored in the buffer 215A, by the contents data supply module 213 so requesting the operating system 201. The buffer control module 215 sends the data, stored in the buffer 215A, to the video decoder control module 216, audio decoder control module 217 and to the caption decoder control module 218, in accordance with the request made by these modules 216 to 218. The buffer control module 215 will be explained in detail subsequently.

The video decoder control module 216 reads out encoded video data, obtained on encoding video data, from the buffer 215A of the buffer control module 215, from one video access unit to another, and sends the so read out data to the video decoder 116 for doing the decoding. The video data, obtained on decoding, are supplied to the graphics processing module 219. The video access unit herein means e.g. one picture sentence of video data, such as one frame or one field.

The audio decoder control module 217 reads out encoded audio data, obtained on encoding audio data, from the buffer 215A of the buffer control module 215, from one audio access unit to another, and sends the so read out data to the audio decoder 117 for doing the decoding. The audio data, obtained on decoding, are supplied to the audio outputting module 221. The audio access unit herein means e.g. a preset data volume of audio data, for example, audio data output in synchronism with one picture.

The caption decoder control module 218 includes, in its inside, a caption decoding software, not shown, and decodes data read out from the buffer 215A to send the caption data, obtained on decoding (picture data of the caption) to the graphics processing module 219. The caption access unit herein means a preset data volume of caption data, for example, a data volume output in synchronism with one picture. In the present embodiment, the size of the caption access unit is stated in the leading end of the caption access unit.

The graphics processing module 219 enlarges or contracts caption data from the caption decoder control module 218, under control (instructions) from the player control module 212, and sums the resulting caption data to the video data from the video decoder control module 216. In addition, the graphics processing module 219 enlarges or contracts the size of video data, resulting from summing the caption data (picture frame), into meeting with a display picture image of a video outputting device, connected to the video output terminal 120, and outputs the resulting video data to the video output module 220.

The video output module 220 exclusively uses a part of the memory device 113 to use it as a FIFO 220A (buffer) for transient storage of video data from the graphics processing module 219. The video output module also reads out the video data stored in the FIFO 220A from time to time and outputs the so read out data to the video output terminal 120.

The audio output module 221 exclusively uses a part of the memory device 113 to use it as a FIFO 221A (buffer) for transient storage of audio data from the audio decoder control module (audio decoder 117). The audio output module also reads out the audio data stored in the FIFO 221A from time to time and outputs the so read out data to the audio output terminal 121.

Figure 7:
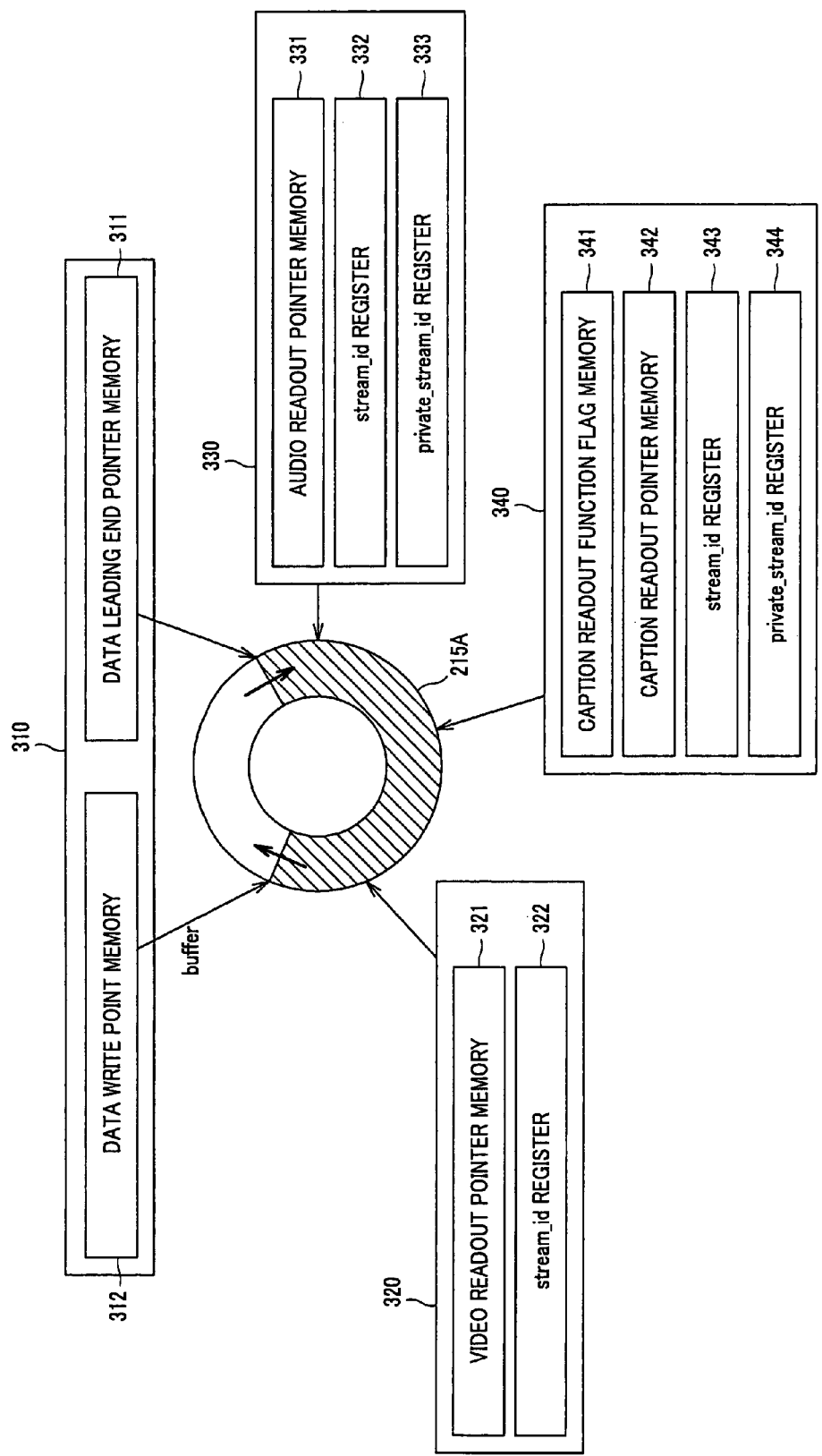
FIG. 7 illustrates a buffer control module embodying the present invention.

The buffer control module 215 will now be explained. FIG. 7 schematically shows the configuration of the buffer control module of the present embodiment.

The buffer control module 215 causes data read out from the disc 101 to be stored transiently in the buffer 215A. The buffer control module also reads out the data to send the read out data to the video decoder control module 216, audio decoder control module 217 and to the caption decoder control module 218 shown in FIG. 6.

To this end, the buffer control module 215 includes, as internal modules, a buffer write unit 310, a video readout unit 320, an audio readout unit 330 and a caption readout unit 340. In FIG. 7, the storage units and the registers, referenced by the respective units, are indicated, for convenience sake, in blocks representing the respective units. However, these storage units and the registers are storage areas for transient storage of the information needed for the respective units to carry out the processing, and are provided within the respective units or on the memory device 113.

The buffer 215A is a ring buffer and memorizes data read out from the disc 101 in an endless loop.

The buffer write unit 310 references the address of the buffer 215A, indicated by the pointers stored in a data leading end pointer memory 311 and in a data write point memory 312, provided in a part of the memory device 113, using these two memory devices, to control the writing in the buffer 215A of the data entered to the buffer control module 215. The data leading end pointer memory 311 memorizes the data leading end pointer, indicating the address where there is stored the oldest data not as yet read out from the buffer 215A, whilst the data write point memory 312 memorizes the write pointer, indicating the address of the buffer 215A where there is written the latest data read out from the disc 101. The data read out from the disc 101 is sequentially written in the buffer 215A beginning from the location thereof indicated by the data write pointer. The data write pointer is updated when the writing has come to a close.

The video readout unit 320 is responsive to a request from the video decoder control module 216 to retrieve the video stream, that is, an elementary stream pertinent to video data, with an address in the buffer 215A, indicated by the pointer stored in a video readout pointer memory 321, as a start point, to send the so read out video stream to the video decoder control module 216. The audio readout unit 330 is responsive to a request from the audio decoder control module 217 to retrieve the audio stream, that is, an elementary stream pertinent to audio data, with an address in the buffer 215A indicated by the pointer stored in a audio readout pointer memory 331 as a start point, to send the so read out video stream to the audio decoder control module 217. The caption readout unit 340 is responsive to a request from the title decoder control module 218 to retrieve the caption stream, that is, an elementary stream pertinent to caption data, with an address in the buffer 215A, indicated by the pointer stored in a caption readout pointer memory 342, as a start point, to send the so read out video stream to the caption decoder control module 218.

In the disc 101, there is stored a program stream conforming to the MPEG2 (Moving Picture Experts Group 2) (MPEG2-System Program Stream) and, in the buffer 215A, there is stored a program stream read out from the disc 101. This program stream is comprised of one or more time-division multiplexed elementary streams, such as video stream, audio stream or caption stream.

The video readout unit 320 has the function of demultiplexing the program stream and demultiplexes the video stream from the program stream stored in the buffer 215A to read out the so demultiplexed video stream. The audio readout unit 330 also has the function of demultiplexing the program stream and demultiplexes the audio stream from the program stream stored in the buffer 215A to read out the so demultiplexed audio stream. Similarly, the caption readout unit 340 has the function of demultiplexing the program stream and demultiplexes the caption stream from the program stream stored in the buffer 215A to read out the so demultiplexed caption stream.

The video readout unit 320 includes the video readout pointer memory 321 and a stream_id register 322 in a portion of the memory device 113 shown in FIG. 5.

The video readout pointer memory 321 memorizes a video readout pointer, indicating the leading location of an area of the buffer 215A not as yet read out by the video decoder control module 216. The video readout unit 320 retrieves and reads out a video stream, with a location of the buffer 215A indicated by the video readout pointer as a start point. The stream_id register 322 analyzes the program stream, stored in the buffer 215A, and memorizes a stream_id, as later explained, for identifying a video stream read out from the program stream.

Figure 2:
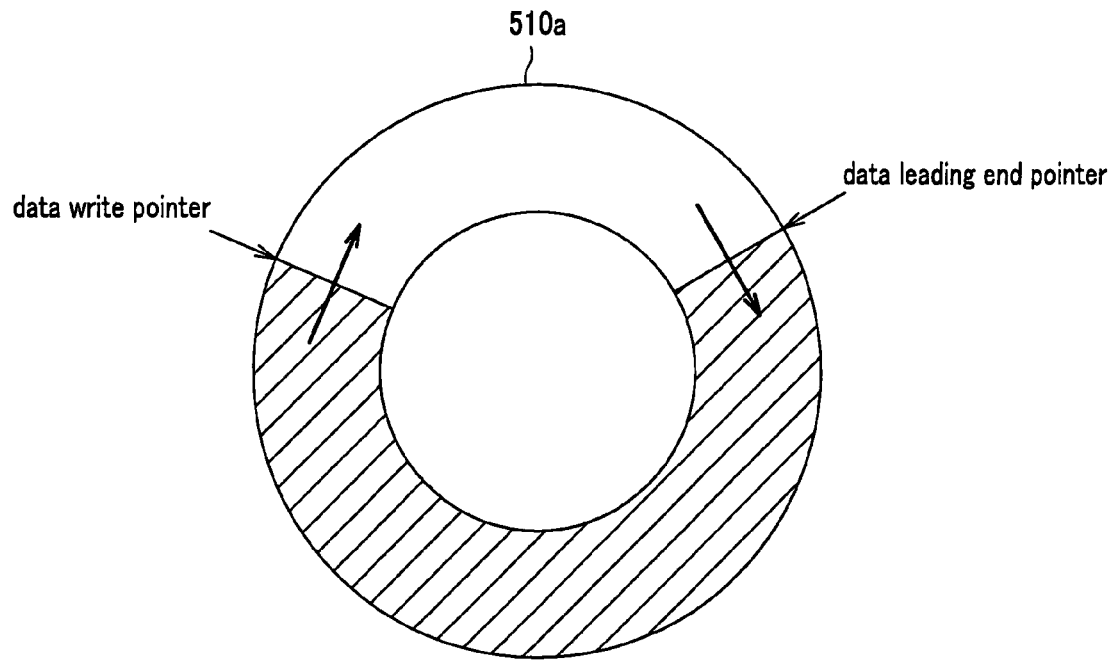
FIG. 2 illustrates a conventional multiplexed stream storage unit.
Figure 2:
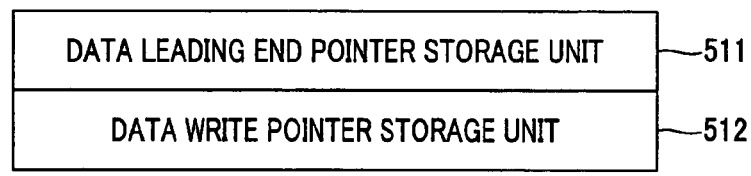
Figure 3:
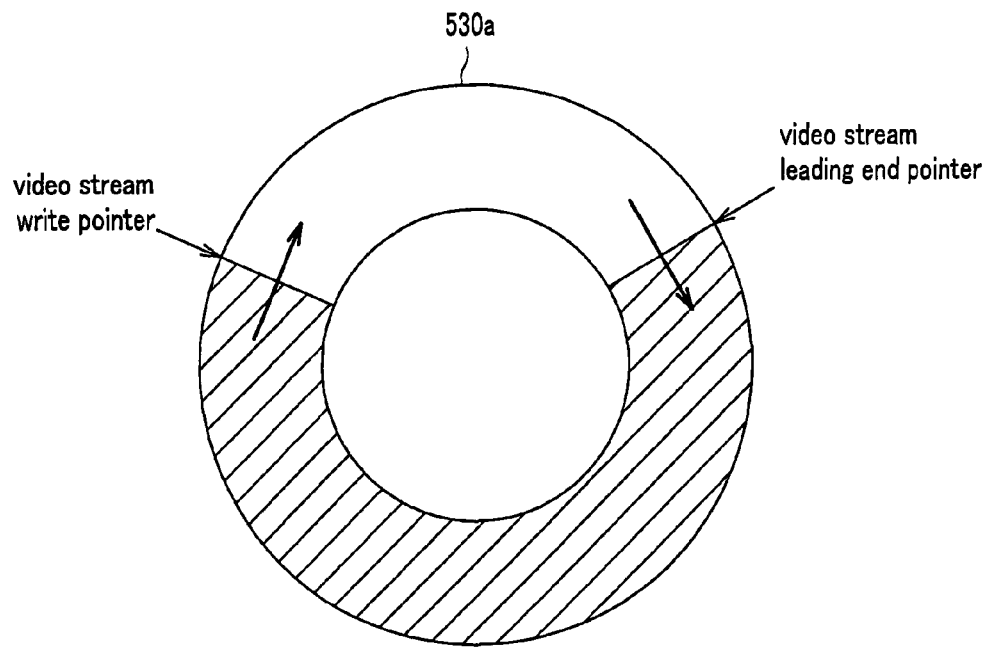
FIG. 3 illustrates a conventional video stream storage unit.
Figure 3:
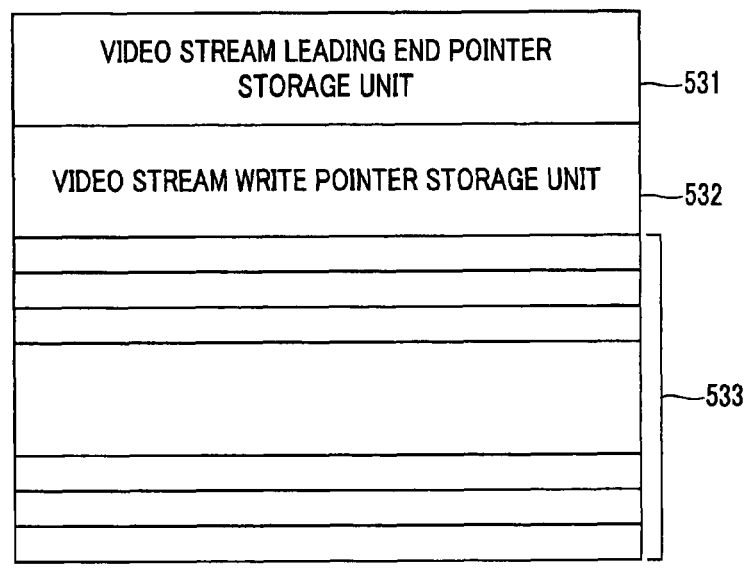

The audio readout unit 330 includes an audio readout pointer memory 331, a stream_id register 332 and a private_stream_id register 333 in a portion of the memory device 113 of FIG. 2.

The audio readout pointer memory 331 memorizes an audio readout pointer, specifying the leading location (address) of an area of the buffer 215A not as yet read out by the audio decoder control module 217. The audio readout unit 330 retrieves and reads out an audio stream, with a location of the buffer 215A specified by the audio readout pointer as a start point. The stream_id register 332 and the private_stream_id register 333 analyze the program stream, stored in the buffer 215A, and memorize a stream_id and a private_stream_id, as later explained, respectively, to discriminate an audio stream to be read out from the program stream.

The caption readout unit 340 includes a caption readout function flag memory 341, a caption readout pointer memory 342, a stream_id register 343 and a private_stream_id register 344, in a portion of the memory device 113 of FIG. 2.

The caption readout function flag memory 341 memorizes a caption readout function flag. When the caption readout function flag, stored in the caption readout function flag memory 341, is 0 or 1, the caption readout unit 340 is not in operation or is in operation, respectively. By halting the readout of the elementary stream, not included in the multiplexed stream, redundant processing on the part of the CPU may be dispensed with. The caption readout pointer memory 342 memorizes the caption readout pointer specifying the leading end position (address) of the area of the buffer 215A not as yet read out by the caption decoder control module 218. The caption readout unit 340 retrieves and reads out a caption stream, with the location of the buffer 215A, specified by the caption readout pointer, as a starting point. The stream_id register 343 and the private_stream_id register 344 analyze the program stream, stored in the buffer 215A, and memorize a stream_id and a provate_stream_id, as later explained, for discriminating the caption stream to be read out from the program stream.

The data format of the data recorded on the disc 101 will now be explained.

Figure 8:
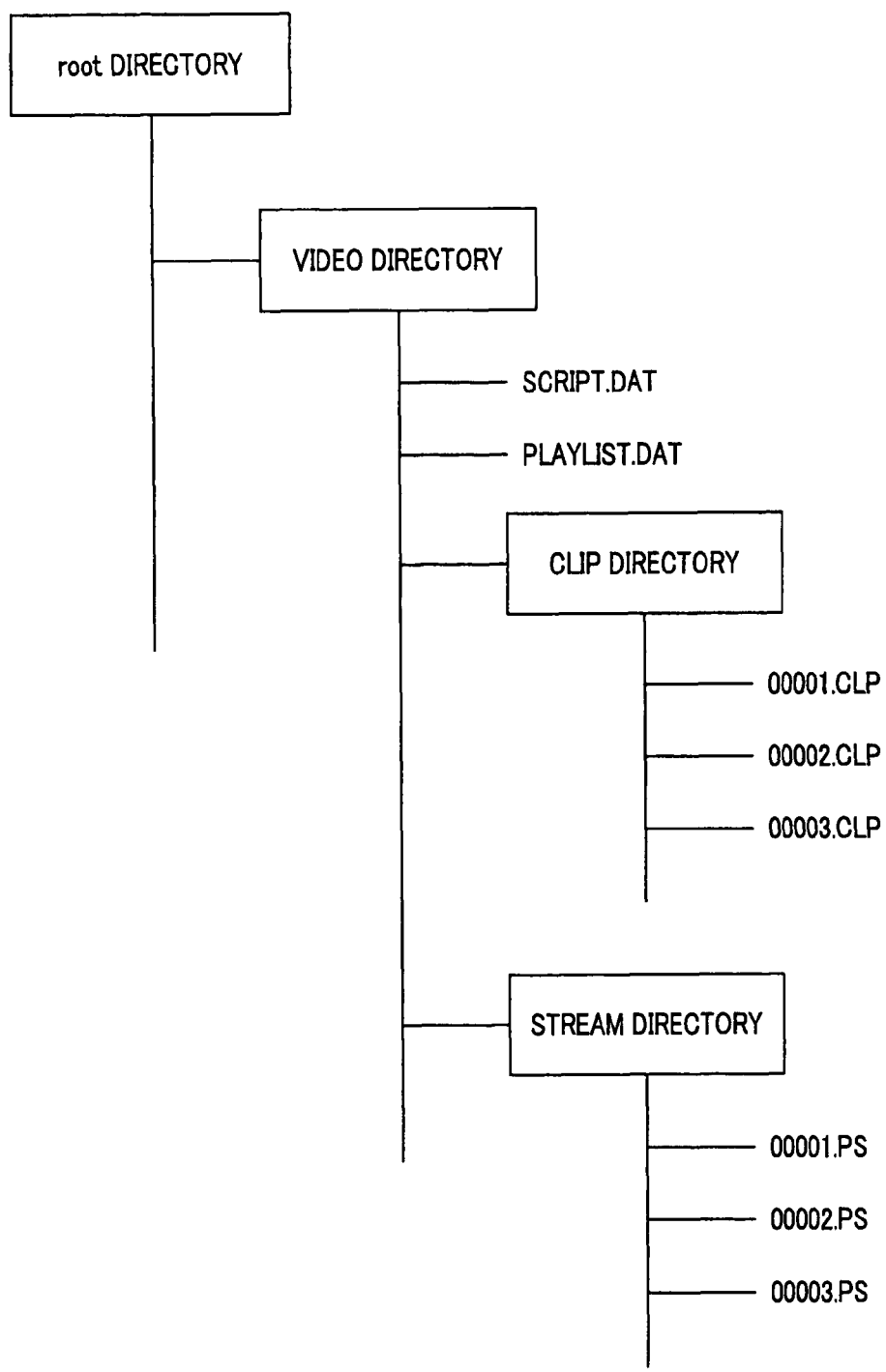
FIG. 8 schematically shows a directory structure of a disc.

FIG. 8 schematically shows the directory structure of a disc.

As a file system of the disc 101, a file system prescribed in, for example, ISO (International Organization for Standardization)-9660 or UDF (Universal Disk Format: http://www.osta.org/specs/), is used, and data files recorded on the disc 101 are hierarchically managed by the directory structure. It is noted that the file system is not limited to the above-described file structure.

Referring to FIG. 8, a 'VIDEO' directory is placed in a root directory, indicating the basic point of a file system, and two directories, namely a 'CLIP' directory and a 'STREAM' directory, are placed in the 'VIDEO' directory.

In the 'VIDEO' directory, a 'SCRIPT.DAT' file and a 'PLAYLIST.DAT' file are placed in addition to the two directories of the 'CLIP' directory and the 'STREAM' directory.

The 'SCRIPT.DAT' file is a script file stating a script program. That is, there is stated, in the 'SCRIPT.DAT' file, a script program used to render the configuration of reproduction of the disc 101 interactive. The script program, stated in this 'SCRIPT.DAT' file, is interpreted and executed by the script control module 211 shown in FIG. 6.

In the 'PLAYLIST.DAT' file, there are stored one or more play lists, stating the sequence of reproduction of contents, such as video data, recorded on the disc 101.

In the 'CLIP' directory, there are placed one or more clip information files and, in the 'STREAM' directory, there are placed one or more clip stream files. That is, in an embodiment of FIG. 8, there are placed three clip information files '00001.CLP', '00002.CLP' and '00003.CLP' in the 'CLIP' directory and, in the 'STREAM' directory, there are placed three clip stream files '00001.PS', '00002.PS' and '00003.PS'.

In the clip stream file, there is stored a program stream, resulting from time-division multiplexing one or more elementary streams, obtained on compressing (encoding) one or more data (streams), such as video data, audio data or caption data.

In the clip information file, there is stated (file) metadata concerning a clip stream, such as properties of a related clip stream file.

The clip stream file and the clip information file are correlated in a one-for-one relationship and, in the embodiment shown in FIG. 8, metadata indicating the properties of the clip stream files '00001.PS', '00002.PS' and '00003.PS', placed in the 'STREAM' directory, are stored in the three clip information files '00001.CLP', '00002.CLP' and '00003.CLP' placed in the 'CLIP' directory. In the metadata, there are a plural number of stream information pertinent to the clip stream, referred to below as StreamInfo( ), corresponding to the number of multiplexed streams. In the leading end of the StreamInfo( ), there is arranged a length (16 bits) representing the size of the StreamInfo( ) including it. Next to this length are arranged a stream_id (8 bits) and a private_stream_id (8 bits). It is the stream_id (8 bits) and the private_stream_id that specify (identify) the elementary stream correlated with the StreamInfo( ).

FIG. 9 shows the relationship between the stream_id and the private_stream_id, identifying an elementary stream, and the elementary stream. The stream_id is the same as that prescribed in the MPEG2-System standard, and is of values predetermined in the MPEG2-System standard from one attribute (sort) of elementary streams (data) to another. Hence, the elementary stream of the attribute, defined by the MPEG2-System standard, may be identified solely by stream_id.

In the present embodiment, it is possible to handle an elementary stream not provided for in the MPEG2-System standard. The private_stream_id is the information for identifying an elementary stream of an attribute not provided for in the MPEG2-System standard. FIG. 6 shows the relationship, with the stream_id and the private_stream_id, of the elementary streams of four attributes, namely a video elementary stream, encoded in accordance with en encoding (decoding) system as provided for in MPEG, an audio elementary stream, encoded in accordance with an ATRAC (Adaptive Transform Acoustic Coding) system, sometimes referred to below as ATRAC audio stream, an audio elementary stream, encoded in accordance with an LPCM (Linear Pulse Code Modulation) system, sometimes referred to below as LPCM audio stream, and a caption elementary stream, sometimes referred to below as caption audio stream.

The MPEG2-System standard provides that a video elementary stream, encoded in accordance with an encoding system prescribed in the MPEG, shall be multiplexed using the values from 0xE0 to 0xEF as stream_id identifying the elementary stream. It is noted that 0x means that the next following string of letters denotes hexadecimal numbers. Thus, insofar as the video elementary streams, encoded in accordance with the encoding system provided for in the MPEG, are concerned, 16 such video elementary streams, that may be identified with stream_ids having the values ranging from 0xE0 to 0xEF, may be multiplexed into a program stream.

Meanwhile, the video elementary streams, encoded in accordance with the encoding system provided for in the MPEG, may be identified with the stream_ids having the values ranging from 0xE0 to 0xEF, so that the private_stream_id is unneeded, that is, may be disregarded. On the other hand, the stream_id is not defined in the MPEG2-System standard as long as the ATRAC audio stream, LPCM audio stream or the caption stream are concerned. Hence, in the present embodiment, the value of 0xBD, representing the value of an attribute private_stream_1 in the MPEG2-System, is used for the stream_id of the elementary stream, the stream_id of which is not defined in the MPEG2-System. Additionally, the private_stream_id is used for discrimination (identification), as shown in FIG. 6.

The operation of the disc apparatus, configured for reproducing the above-described program stream, will now be explained, mainly in connection with the processing of the buffer control module 215. In the explanation to follow, it is assumed that a video stream, an ATRAC audio stream and two caption streams have been multiplexed to a target clip stream file '00001.PS'.

When the disc 101 has been inserted into the disc drive 102, and this has been notified via operating system 201, the processing for reproduction is started in accordance with the video contents reproducing program 210.

In the processing for reproduction, pre-reproduction processing is carried out such that, before the program stream, stored in the clip stream file '00001.PS', to which is multiplexed the elementary stream to be reproduced, starts to be supplied to the buffer control module 215, the player control module 212 initializes the buffer control module 215.

'Pre-Reproduction Processing'

Specifically, the buffer control module 215 substitutes the same values for the data leading end pointer, stored in the data leading end pointer memory 311, data write pointer stored in the data write point memory 312, video readout pointer stored in the video readout pointer memory 321, audio readout pointer stored in the audio readout pointer memory 331 and the title readout pointer stored in the caption readout pointer memory 342. Hence, the data leading end pointer, stored in the data leading end pointer memory 311, and the data write pointer, stored in the data write point memory 312, point to the same location in the buffer 215A of the buffer control module 215. This stands for the state in which no valid data has been stored in the buffer 215A.

For discriminating (identifying) an elementary stream being reproduced, the player control module 212 reads out, as discrimination information, the stream_id and, if necessary, the private_stream_id, from the clip information file '00001.CLP' relating to the clip stream file '00001.PS' of interest, to send the so read out data to the buffer control module 215. That is, in the elementary stream being reproduced, a video stream, having an attribute of the 'video stream', is identified by a stream_id, which is 0xE0, an ATRAC audio stream, having an attribute of the 'audio stream', is identified by a stream_id, which is 0xBD, and a private_stream_id, which is 0x00, and a caption stream, having an attribute of the 'caption stream', is identified by a stream_id, which is 0xBD, and by a private_stream_id, which is 0x80. The player control module 212 sends these stream_ids and private_stream_ids to the buffer control module 215.

In the buffer control module 215, the video readout unit 320 allows the stream_id for the video stream, which is 0xE0, from the player control module 212, to be stored in the stream_id register 322. The audio readout unit 330 allows the stream_id, which is 0xBD, and the private_stream_id, which is 0x00, from the player control module 212, to be stored in the stream_id register 332 and in the private_stream_id register 333, respectively. In addition, the caption readout unit 340 allows the stream_id, which is 0xBD, and the private_stream_id, which is 0x80, from the player control module 212, to be stored in the stream_id register 343 and in the private_stream_id register 344, respectively.

The player control module 212 also sets a caption readout function flag of a value relating to the clip stream file, to which has been multiplexed the elementary stream being reproduced, in the caption readout function flag memory 341. That is, in the instant case, since the caption stream is contained in the clip stream file '00001.PS', the elementary stream is multiplexed to, the caption readout function flag with the value equal to '1' is set in the caption readout function flag memory 341, in order to cause the operation of the caption readout unit 340. Meanwhile, in case no caption stream is contained in the clip stream file, the elementary stream is multiplexed to, the caption readout function flag with the value equal to '0' is set in the caption readout function flag memory 341. In this case, the caption readout unit 340 is not in operation, that is, it carries out no specified operation.

[Start of Data Readout]

The player control module 212 then controls the contents data supply module 213, so that the contents data supply module 213 reads out the clip stream file, the elementary stream being reproduced is multiplexed to, using the function of the operating system 201. The contents data supply module 213 also specifies the data, read out from the disc 101, as being the data to be supplied to the buffer control module 215. So, the program stream, stored in the clip stream file '00001.PS', from the disc 101, starts to be read out from the disc 101, and is sent to the buffer control module 215.

The buffer control module 215 allows the program stream, read out from the disc 101, to be written at a location of the data write point memory 312 of the buffer 215A, specified by a data write pointer, and increments the data write pointer in an amount corresponding to the size of the written data.

In the explanation to follow, it is assumed that, unless otherwise specified, the contents data supply module 213 reads out data from the disc 101 to send the so read out data to the buffer 215A of the buffer control module 215, to cause the data to be stored therein, should there be vacant area in the buffer 215A. Consequently, there is stored a sufficient amount of data at all times in the buffer 215A.

[Start of Decoder Control]

When data begins to be read out from the disc 101 as described above and the data so read out begins to be stored in the buffer 215A of the buffer control module 215, the decoding control module 214 controls the video decoder control module 216, audio decoder control module 217 and the caption decoder control module 218 to start readout of data from the buffer 215A as a pre-stage of the decoding operation.

[Processing of Buffer Control Module]

Figure 10:
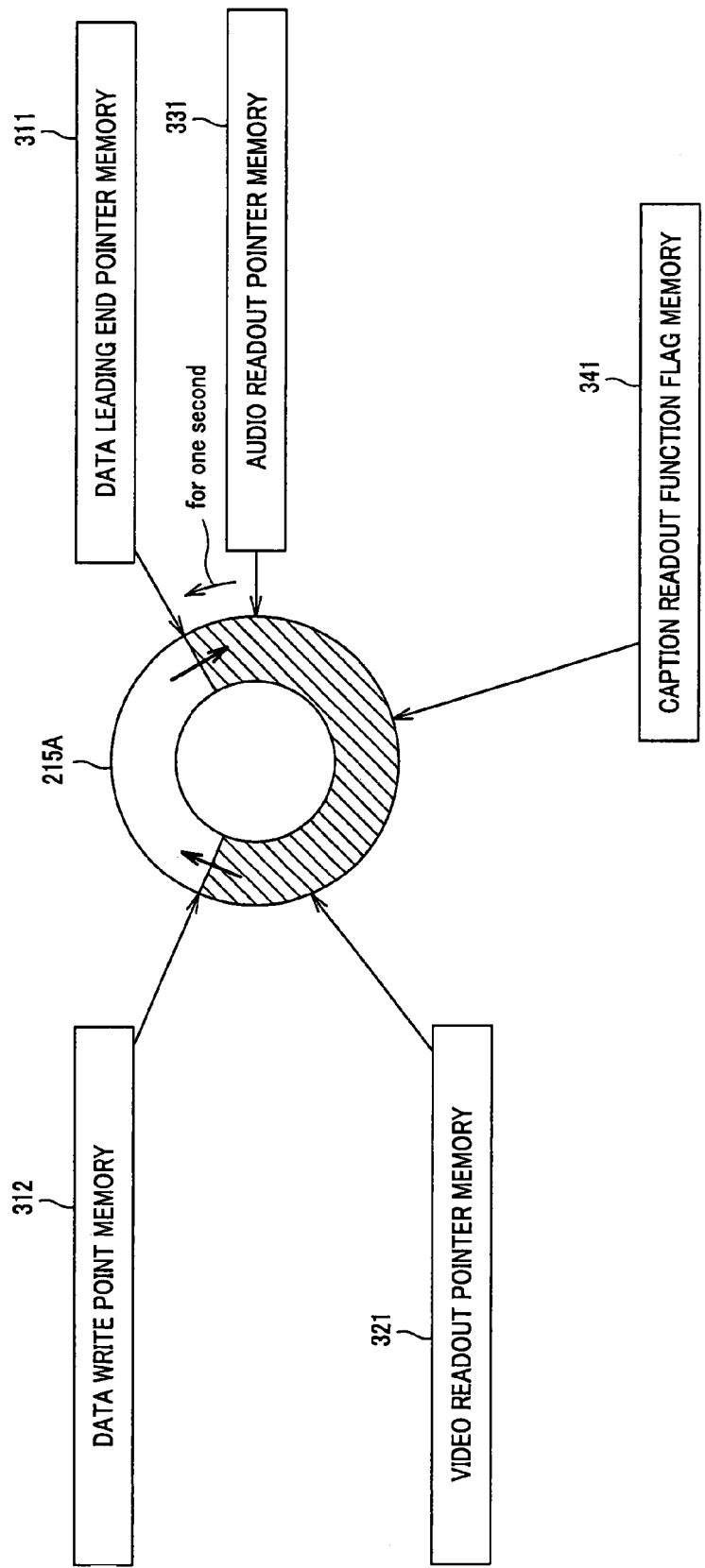
FIG. 10 illustrates the state prior to pointer updating by data readout of the buffer control module.
Figure 11:
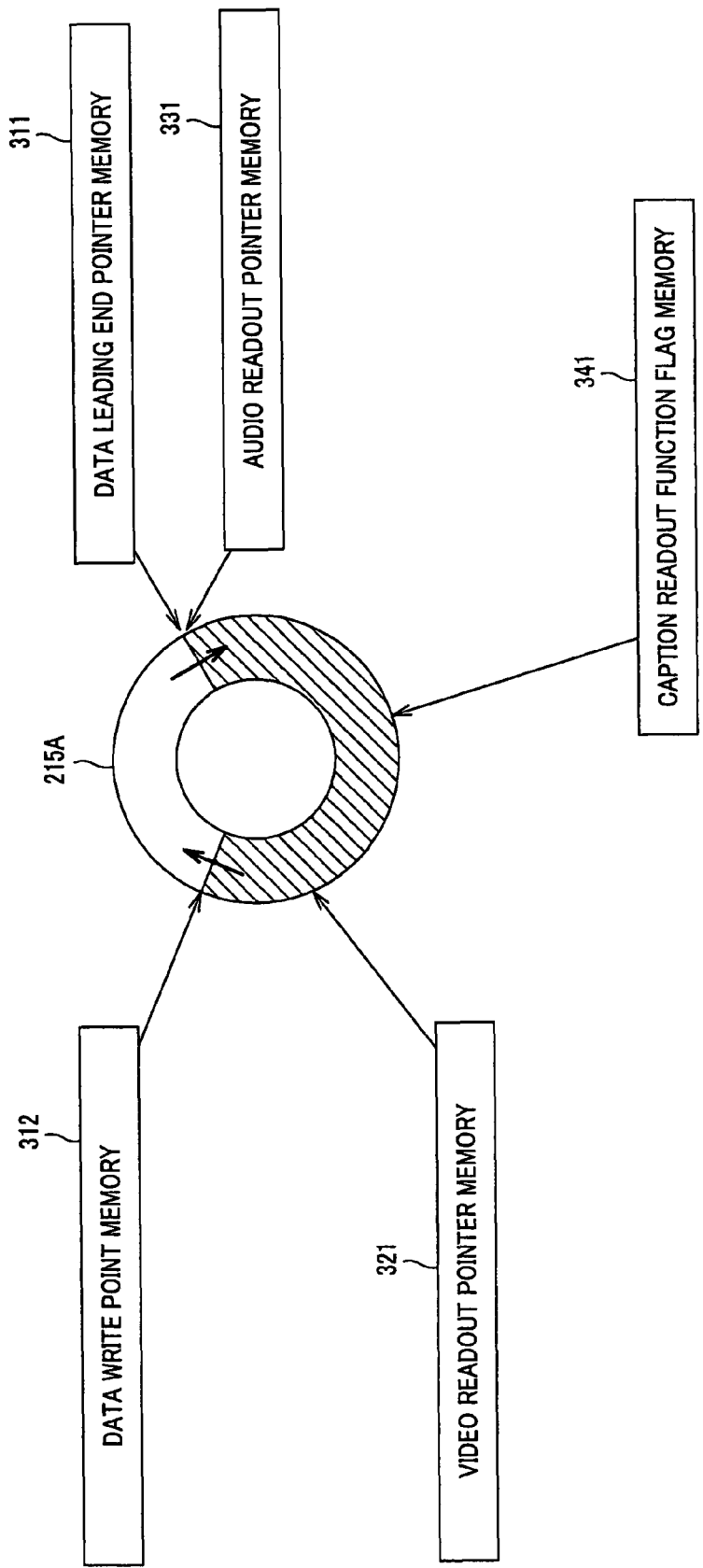
FIG. 11 illustrates the state subsequent to pointer updating by data readout of the buffer control module.

Referring to FIGS. 10 and 11, processing of the buffer control module 215, that is, data writing in and data readout from the buffer 215A, will be explained. FIGS. 10 and 11 show an illustrative pointer update operation, attendant on data readout by the buffer control module. Specifically, FIGS. 10 and 11 illustrate a location pointed to by the audio readout pointer prior to updating and a location pointed to by the audio readout pointer subsequent to updating, respectively.

The buffer control module 215 includes five pointers for trading data from or writing data in the buffer 215A, as shown in FIG. 7.

That is, in FIGS. 10 and 11, the buffer control module 215 includes a data leading end pointer, stored in the data leading end pointer memory 311, a data write pointer, stored in the data write point memory 312, a video readout pointer, stored in the video readout pointer memory 321, an audio readout pointer, stored in the audio readout pointer memory 331, and a caption readout pointer, stored in the caption readout pointer memory 342.

Meanwhile, in FIG. 10 and FIG. 11, the stream_id register 322 of the video readout unit 320, the stream_id register 332 and the private_stream_id register 333 of the audio readout unit 330, and the caption readout function flag memory 341, stream_id register 343 and the private_stream_id register 344 of the caption readout unit 340, shown in FIG. 6, are not shown for clarity.

The data leading end pointer, stored in the data leading end pointer memory 311, denotes the location of the oldest data left in the buffer 215A. The oldest data means the oldest data that needs to be read out but are not as yet read out. The data write pointer stored in the data write point memory 312 denotes the data write location in the buffer 215A. This location is a location in the buffer 215A where there is written the latest data.

The video readout pointer, stored in the video readout pointer memory 321, denotes the location of the video stream read out from the buffer 215A. The audio readout pointer, stored in the audio readout pointer memory 331, denotes the location of the audio stream read out from the buffer 215A, whilst the caption readout pointer, stored in the caption readout pointer memory 321, denotes the location of the caption stream read out from the buffer 215A.

Moreover, in the present embodiment, the data leading end pointer is updated at all times for pointing to the same location as the location of the oldest one of the data pointed by the video readout pointer, audio readout pointer and the caption readout pointer, as shown in FIG. 11. It is noted that, in FIG. 11, the audio readout pointer, out of the video readout pointer, audio readout pointer and the caption readout pointer, points to the location of the oldest data, and that the data leading end pointer coincides with the audio readout pointer.

If, in the buffer control module 215, having the data leading end pointer, video readout pointer, audio readout pointer and the caption readout pointer, new data has been read out from the disc 101 and written in the buffer 215A, the data write pointer is updated clockwise for pointing to a location directly after the new written data.

When the video stream, audio stream or the caption stream have been read out from the buffer 215A, the video readout pointer, audio readout pointer or the caption readout pointer is updated clockwise by an amount corresponding to the amount of data of the read out stream. The amount corresponding to the amount of data of the read out stream herein means the amount of the data actually read out of the video, audio or caption data of the stream plus the data of another stream(s) contained in the read out data but skipped without being read.

When the video readout pointer, audio readout pointer and the caption readout pointer are updated, the data leading end pointer is updated for pointing to the same location as the location specifying the oldest one of data pointed to by the video readout pointer, audio readout pointer and the caption readout pointer.

It is noted that the buffer control module 215 controls the writing in the buffer 215A so that, in connection with data writing in the buffer 215A, the data write pointer will not outrun the data leading end pointer.

That is, except if the data leading end pointer is surpassed by the data write pointer, the data read out from the disc 101 is written in a location in the buffer 215A in the buffer control module 215, as the data write pointer is updated. On the other hand, in the event of impending outrunning of the data leading end pointer by the data write pointer, the buffer control module 215 requests the contents data supply module 213 to halt or discontinue data readout from the disc 101, whilst data writing in the buffer 215A is halted. This prohibits overflow in the buffer 215A.

The writing of data read out from the disc 101 in the buffer 215A is controlled solely by the position relationship of two pointers, namely the data leading end pointer and the data write pointer.

On the other hand, the buffer control module 215 controls data readout from the buffer 215A so that, in connection with data readout from the buffer 215A, the video readout pointer, audio readout pointer and the caption readout pointer, and further the data leading end pointer, will not overrun the data write pointer.

That is, in the buffer control module 215, data readout is started from the location in the buffer 215A pointed to by the video readout pointer, audio readout pointer or the caption readout pointer, responsive to a request from the video decoder control module 216, audio decoder control module 217 or the caption decoder control module 218, except if the data write pointer is overrun by the video readout pointer, audio readout pointer or the caption readout pointer, as the video readout pointer, audio readout pointer or the caption readout pointer, and further the data leading end pointer, are updated. On the other hand, if the data write pointer is most likely to be overrun by the video readout pointer, audio readout pointer or the caption readout pointer, the buffer control module 215 'freezes' the request from the video decoder control module 216, audio decoder control module 217 or the caption decoder control module 218, to wait until there is provided a sufficient quantity of data. This prohibits underflow of the buffer 215A.

It is seen from above that data to be supplied to the video decoder control module 216, audio decoder control module 217 and to the caption decoder control module 218 are stored in an area of the buffer 215A proceeding clockwise from a location pointed to by the data leading end pointer up to a location pointed to by the data write pointer (an area shown shaded in FIG. 4, 7 or 10), and that the video readout pointer, audio readout pointer and the caption readout pointer are present in this area.

In the foregoing explanation, the data leading end pointer is updated to point to the location of the oldest data out of the locations pointed to by the video readout pointer, audio readout pointer and the caption readout pointer. It is however also possible to update the data leading end pointer to point to a location of past data a preset time, such as one second, before the location of the oldest data.

That is, it may be predicted that, in general, the video readout pointer or the audio readout pointer, out of the above three sorts of the pointers, point the oldest data, in a majority of cases.

Hence, if the data leading end pointer is updated to point to the location of past data one second before the location of the oldest data, data for past one second as from the location of the oldest data pointed to by the video readout pointer or the audio readout pointer may be left in the buffer 215A, as shown in FIG. 10. It is noted that, in FIG. 10, the audio readout pointer points to the location of the oldest data, with the data leading end pointer pointing to the location of the past data one second past the location of the oldest data.

As described above, when the data leading end pointer is updated to point to the location of past data one second, response of the disc apparatus can be improved.

That is, if the data leading end pointer is updated for pointing to the oldest data specified by the audio readout pointer, as shown in FIG. 11, and special reproduction in the reverse direction, for example, is specified, the data already read out from the buffer 215A has to be read out again from the disc 101, such that it takes some time until the special reproduction becomes possible since the command for the special reproduction is issued.

If conversely the data leading end pointer is updated for pointing to the location of the past data one second older than the location of the oldest data pointed to by the audio readout pointer, as shown in FIG. 10, a command is issued for reproduction in the reverse direction, as special reproduction, and the data necessary for starting reproduction in the reverse direction, as special reproduction, is one second past data stored in the buffer 215A, the special reproduction may be started instantaneously, without re-reading data from the disc 101, as described above.

It should be noted that, if the data leading end pointer is updated for pointing to the location of the data one second past the location of the oldest data pointed to by the audio readout pointer, it may be an occurrence that data needed for starting the special reproduction has not been stored in the buffer 215A. In such case, the data needed for starting the special reproduction is again read out from the disc 101.

Readout of the video stream, audio stream and the caption stream from the buffer 215A will now be explained in detail.

In starting reproduction of the clip stream, the buffer control module 215 initializes the data leading end pointer, data write pointer, video readout pointer, audio readout pointer and the caption readout pointer so that these pointers point to the same location on the buffer 215A.

When the program stream (MPEG2-System Program Stream), stored in a clip stream file, is reproduced from the disc 101, and supplied to the buffer control module 215, the program stream is stored in a location of the buffer 215A, as pointed to by the data write pointer of the buffer 215A, as the data write pointer is updated clockwise.

In the buffer control module 215, the video readout unit 320 analyzes the syntax of the program stream, stored in the buffer 215A, using the information recorded in the stream_id register 322. The video readout unit extracts (separates) and reads out a video stream (video access unit), from the program stream stored in the buffer 215A, responsive to a request from the video decoder control module 216, to send the so extracted video stream to the video decoder control module 216.

In similar manner, the audio readout unit 330 analyzes the syntax of the program stream, stored in the buffer 215A, using the information recorded in the stream_id register 332 and a private_stream_id register 333. The audio readout unit extracts (separates) and reads out an audio stream (audio access unit), from the program stream stored in the buffer 215A, responsive to a request from the audio decoder control module 217, to send the so extracted audio stream to the audio decoder control module 217. The caption readout unit 340 also analyzes the syntax of the program stream, stored in the buffer 215A, using the information recorded in the stream_id register 343 and in the private_stream_id register 344, while extracting (separating) and reading out a caption stream (caption access unit), from the program stream stored in the buffer 215A, responsive to a request from the caption decoder control module 218, to send the so extracted video stream to the caption decoder control module 218.

In this manner, the respective elementary streams may be sent to the decoder as the streams are demultiplexed by the video readout unit 320, audio readout unit 330 and the caption readout unit 340. This assures reduced data movements and for improved processing ability of the CPU.

In the conventional system, the buffer function, taken charge of by the respective ES storage unit, is transferred to the buffer control module 215, so that it becomes necessary to add a corresponding amount of the capacity to the buffer 215A of the buffer control module 215. For example, since the MPEG2-System provides that the delay in the respective ES memories shall be less than one second, it becomes necessary to provide a capacity just large enough to store a multiplexed stream with one-second duration. That is, in the MPEG2-System program stream, it is only sufficient to add a capacity equal to the product of the delay in the STD (STD_delay) and the rate of multiplexing (program_mux_rate).

It should be understood by those skilled in the art that various modifications, combinations sub-combinations and alterations may occur depending on design requirements and other factors insofar as they are within the scope of the appended claims or the equivalents thereof.

The invention claimed is:

1. A demultiplexer for demultiplexing a multiplexed stream, obtained on time division multiplexing a plurality of elementary streams, comprising a ring buffer for sequentially storing data of said multiplexed stream;
    data leading end storage means for storing a data leading end pointer specifying a location in said ring buffer where the oldest data of said multiplexed stream has been stored;
    write pointer storage means for storing a data write pointer specifying a location where the latest data of said multiplexed stream is to be stored;
    buffer control means for writing said multiplexed stream, when said multiplexed stream is supplied thereto, beginning from a location in said ring buffer specified by said data write pointer, and for updating said data write pointer depending on the write size;
    readout pointer storage means for storing a readout pointer, specifying a location in said ring buffer which becomes a starting point of readout processing of said elementary streams, from every said elementary stream which is to be read out; and
    readout control means for taking out said readout pointer concerning said elementary stream, requested to be read out, retrieving and reading out targeted said elementary stream from a location of said ring buffer specified by said readout pointer as a start point, updating said readout pointer depending on the readout size and for updating said data leading end pointer,
    wherein said readout control means substitutes one of a plurality of said readout pointers, specifying a location where the oldest data is stored, into said data leading end pointer,
    wherein said readout control means compares a readout pointer of said elementary stream as read out to a readout pointer of another elementary stream, forming said multiplexed stream, and
    wherein said readout control means in case the readout pointer of said elementary stream as read out points to a location of storage of data with the oldest readout pointer substitutes the readout pointer of said elementary stream as read out into said data leading end pointer.

2. The demultiplexer according to claim 1 wherein, after a preset elementary stream has been read out, said readout control means sets said data leading end pointer of said ring buffer at a location offset from the location of said ring buffer corresponding to the end of said readout by an area for storage of data of said preset elementary stream corresponding to a preset time period.

3. The demultiplexer according to claim 1 wherein said readout control means sequentially analyzes an elementary stream packet, stored in said ring buffer, beginning from a readout start point indicated by said readout pointer, retrieves said elementary stream requested to be read out, and reads out the retrieved elementary stream.

4. The demultiplexer according to claim 3 wherein said readout control means retrieves encoded video data based on the identification information which discriminates the sort of said elementary stream contained in said elementary stream packet.

5. The demultiplexer according to claim 1 further comprising
decision means for verifying whether or not a preset elementary stream is contained in said multiplexed stream, and wherein the operation of said readout control means relating to said preset elementary stream is halted when said decision means has verified that said preset elementary stream is not contained in said multiplexed stream.

6. A demultiplexer for demultiplexing a multiplexed stream, obtained on time division multiplexing a plurality of elementary streams, comprising
a ring buffer for sequentially storing data of said multiplexed stream;
a data leading end storage unit for storing a data leading end pointer specifying a location in said ring buffer where the oldest data of said multiplexed stream has been stored;
a write pointer storage unit for storing a data write pointer specifying a location where the latest data of said multiplexed stream is to be stored;
a buffer controller for writing said multiplexed stream, when said multiplexed stream is supplied thereto, beginning from a location in said ring buffer specified by said data write pointer, and for updating said data write pointer depending on the write size;
a readout pointer storage unit for storing a readout pointer, specifying a location in said ring buffer which becomes a starting point of readout processing of said elementary streams, from every said elementary stream which is to be read out; and
a readout controller for taking out said readout pointer concerning said elementary stream, requested to be read out, retrieving and reading out targeted said elementary stream from a location of said ring buffer specified by said readout pointer as a start point, updating said readout pointer depending on the readout size and for updating said data leading end pointer,
wherein said readout controller substitutes one of a plurality of said readout pointers, specifying a location where the oldest data is stored, into said data leading end pointer,
wherein said readout controller compares a readout pointer of said elementary stream as read out to a readout pointer of another elementary stream, forming said multiplexed stream, and
wherein said readout controller in case the readout pointer of said elementary stream as read out points to a location of storage of data with the oldest readout pointer substitutes the readout pointer of said elementary stream as read out into said data leading end pointer.

7. A method for demultiplexing a multiplexed stream, obtained on time division multiplexing a plurality of elementary streams, comprising the steps of
buffer control means when supplied with said multiplexed stream sequentially writing said multiplexed stream supplied, based on a data write pointer indicating the latest data write location of a ring buffer configured for sequentially memorizing data of said multiplexed stream in an endless loop, at a location of said ring buffer specified by said data write pointer, and updating said data write pointer depending on the write size; and
readout control means on receipt of a readout request for a preset one of said elementary streams taking out said readout pointer concerning said preset elementary stream as requested by readout pointer storage means, having stored a readout pointer as starting point of elementary-stream-based readout processing, retrieving and reading out said preset elementary stream of interest, with a location of said ring buffer, specified by said readout pointer, as a start point, updating said readout pointer depending on the readout size and updating the data leading end pointer specifying the location of said ring buffer where the oldest data of said multiplexed stream is stored,
wherein said readout control means substitutes one of a plurality of said readout pointers, specifying a location where the oldest data is stored, into said data leading end pointer,
wherein said readout control means compares a readout pointer of said preset elementary stream as read out to a readout pointer of another preset elementary stream, forming said multiplexed stream, and
wherein said readout control means in case the readout pointer of said preset elementary stream as read out points to a location of storage of data with the oldest readout pointer substitutes the readout pointer of said preset elementary stream as read out into said data leading end pointer.

8. A demultiplexer for demultiplexing a multiplexed stream, obtained on time division multiplexing a plurality of elementary streams, comprising
a ring buffer for storage of at least first and second elementary streams, first readout control means for reading out said first elementary stream from said ring buffer in a controlled manner, and second readout control means for reading out said second elementary stream from said ring buffer in a controlled manner; wherein
said first elementary stream or said second elementary stream is read out, responsive to a readout request of one of said elementary streams of said multiplexed stream, by said first or second readout control means relating to said one elementary stream,
readout comparing means for comparing a first readout pointer of said first elementary stream as read out to a second readout pointer of second elementary stream, forming said multiplexed stream, and
wherein said readout comparing means in case the readout pointer of said first elementary stream as read out points to a location of storage of data with an oldest readout pointer substitutes the first readout pointer of said first elementary stream as read out into a data leading end pointer.

9. The demultiplexer according to claim 8 further comprising
data end point storage means for storing a data leading end pointer specifying a location of storage in said ring buffer of the oldest data of said multiplexed stream; and
readout pointer storage means for storing a readout pointer specifying a location as a start point of readout of each of said elementary streams from said ring buffer, for each elementary stream being read out; wherein
said first readout control means or said second readout control means sequentially analyzes an elementary stream packet, stored in said ring buffer, beginning from a readout start point specified by said readout pointer, responsive to a readout request, and reads out the retrieved elementary stream.

10. The demultiplexer according to claim 9 wherein
said first readout control means and said second readout control means retrieves encoded video data based on the identification information which discriminates the sorts of said elementary streams contained in said elementary stream packet.

11. A demultiplexer for demultiplexing a multiplexed stream, obtained on time division multiplexing a plurality of elementary streams, comprising a ring buffer for storage of at least first and second elementary streams, a first readout controller for reading out said first elementary stream from said ring buffer in a controlled manner, and a second readout controller for reading out said second elementary stream from said ring buffer in a controlled manner; wherein said first elementary stream or said second elementary stream is read out, responsive to a readout request of one of said elementary streams of said multiplexed stream, by said first or second readout controller relating to said one elementary stream, readout comparing means for comparing a first readout pointer of said first elementary stream as read out to a second readout pointer of second elementary stream, forming said multiplexed stream, and wherein said readout comparing means in case the readout pointer of said first elementary stream as read out points to a location of storage of data with an oldest readout pointer substitutes the first readout pointer of said first elementary stream as read out into a data leading end pointer.

* * * * *